(12) United States Patent
Foster

(10) Patent No.: US 7,383,611 B2
(45) Date of Patent: Jun. 10, 2008

(54) CASTORS

(75) Inventor: Alan Foster, Glosson (GB)

(73) Assignee: Castor Technology Ltd., Hyde, Cheshire (GB)

( * ) Notice: Subject to any disclaimer, the term of this patent is extended or adjusted under 35 U.S.C. 154(b) by 0 days.

(21) Appl. No.: 10/526,770

(22) PCT Filed: Aug. 26, 2003

(86) PCT No.: PCT/GB03/03700

§ 371 (c)(1),
(2), (4) Date: Feb. 28, 2005

(87) PCT Pub. No.: WO2004/020225

PCT Pub. Date: Mar. 11, 2004

(65) Prior Publication Data

US 2006/0010644 A1   Jan. 19, 2006

(30) Foreign Application Priority Data

Aug. 28, 2002 (GB) .................................. 0219942.0
Feb. 12, 2003 (GB) .................................. 0303274.5

(51) Int. Cl.
*B60B 33/00* (2006.01)
*B60B 33/02* (2006.01)
*B60B 33/04* (2006.01)

(52) U.S. Cl. ............................................. 16/20; 16/21

(58) Field of Classification Search .................... 16/20, 16/35 R, 21–23, 18 R, 19, 48, 31 R, 28, 16/29; 280/43; 384/446

See application file for complete search history.

(56) References Cited

U.S. PATENT DOCUMENTS

| 2,799,514 | A  | * | 7/1957  | Kramcsak, Jr. ................ 280/29 |
| 3,890,668 | A  | * | 6/1975  | Stosberg et al. ............. 16/35 R |
| 4,054,965 | A  |   | 10/1977 | Vig et al. |
| 4,887,824 | A  | * | 12/1989 | Zatlin .................... 280/87.042 |
| 6,728,991 | B2 | * | 5/2004  | Lai et al. ........................ 16/19 |
| 2004/0117943 | A1 | * | 6/2004 | Block et al. ................. 16/18 R |

FOREIGN PATENT DOCUMENTS

| JP | 05254306 | 10/1993 |
| JP | 10264603 | 10/1998 |

* cited by examiner

*Primary Examiner*—Robert J Sandy
(74) *Attorney, Agent, or Firm*—Woodard, Emhardt, Moriarty, McNett & Henry LLP

(57) ABSTRACT

A support structure for a castor, a castor provided with such a support-structure, and a castored trolley is described. The support structure comprises a first member 5, a second member 3 that is rotatable with respect to the first member about a pivot axis, and magnetic means 21, 23, 61, 63 that is operable up to a certain torque to restrain movement of the rotatable member from one angular position with respect to the first member. Preferably the magnetic means comprises at least one hair of magnetically co-operable components. Preferably one component of the at least one pair of components is a permanent magnet. In another angular positions without registration of the first and second members free rotation is possible unless and until re-registration occurs.

23 Claims, 4 Drawing Sheets

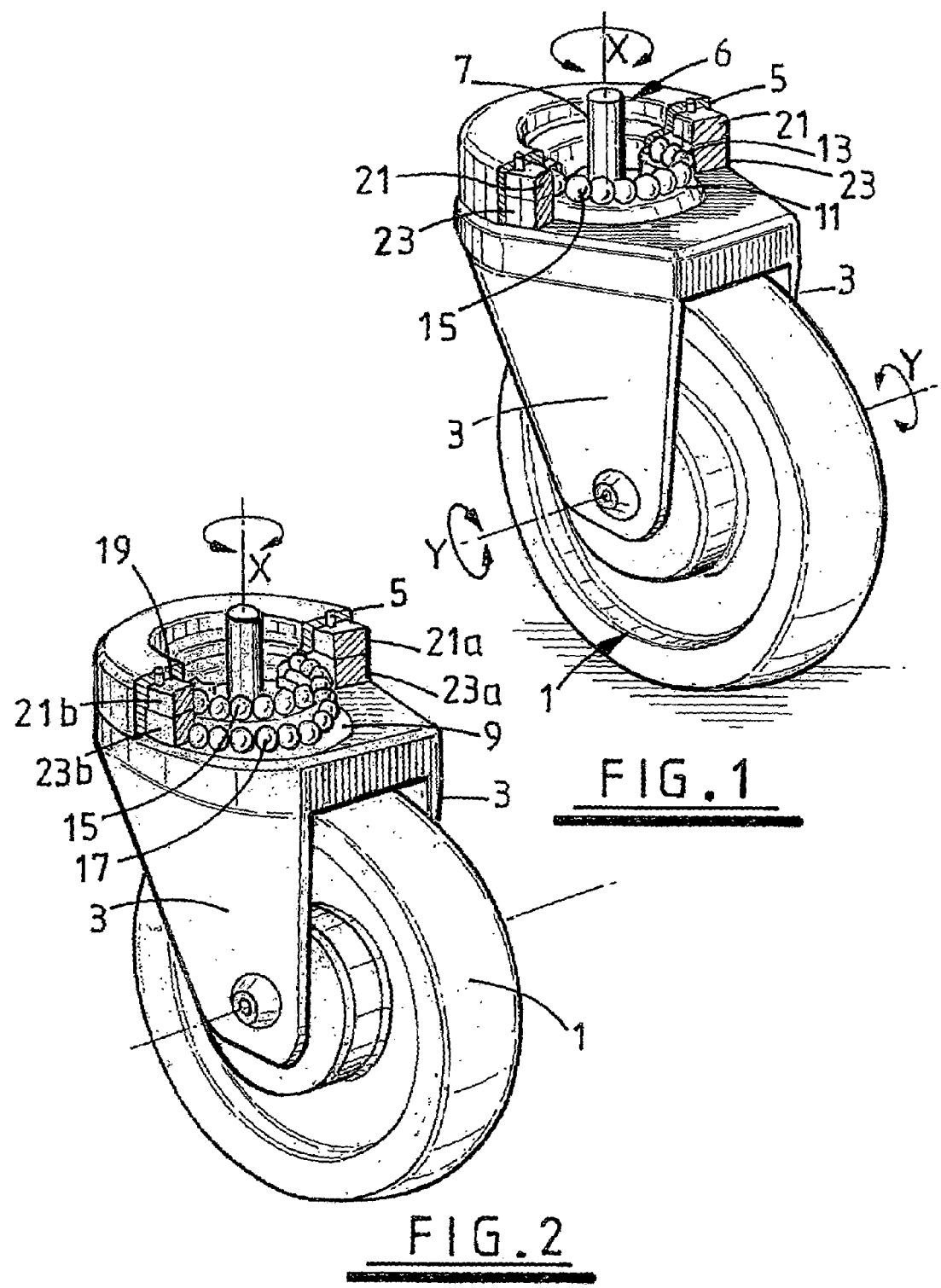

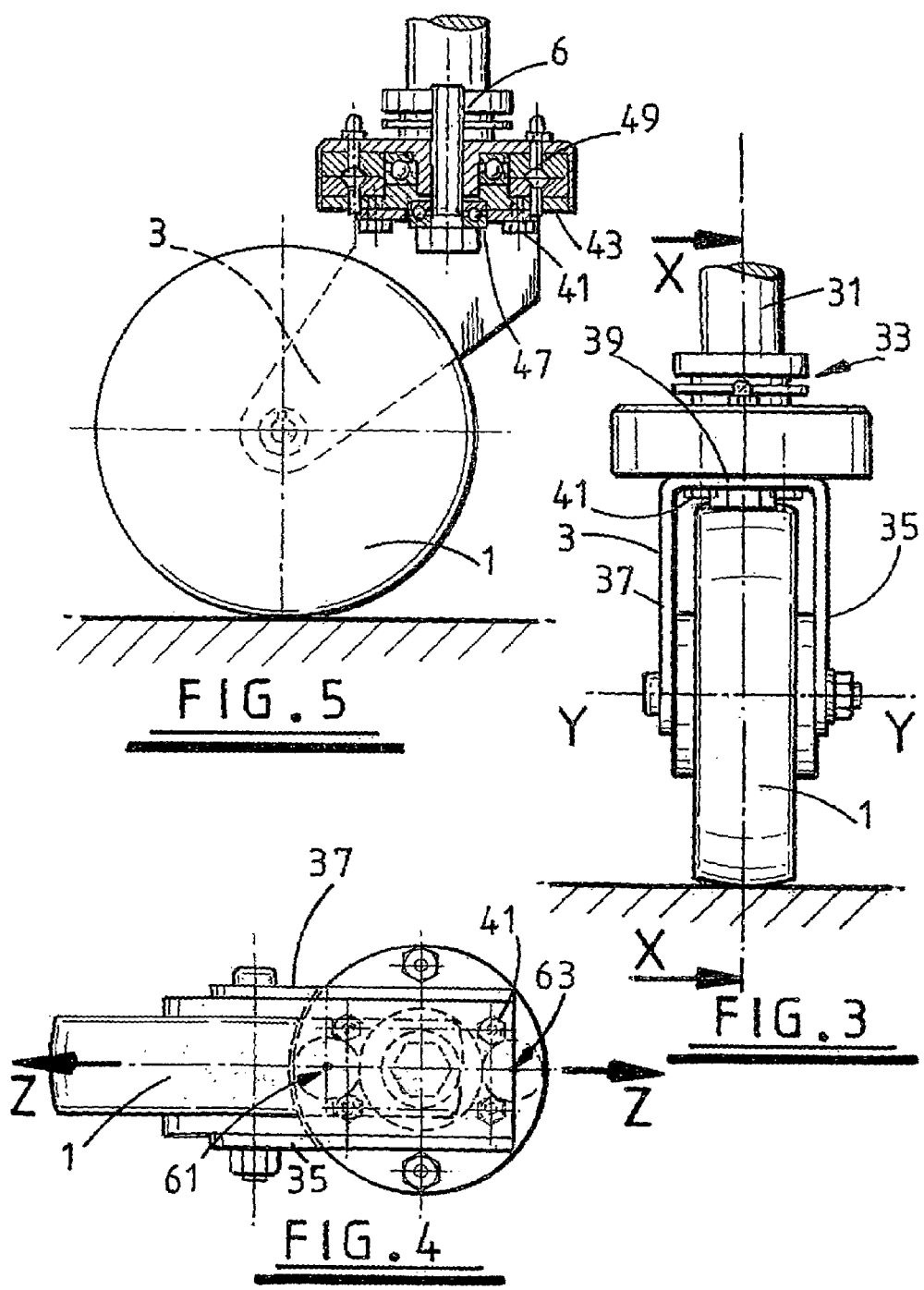

CASTORS

CROSS-REFERENCE TO RELATED APPLICATION

Figure 6:
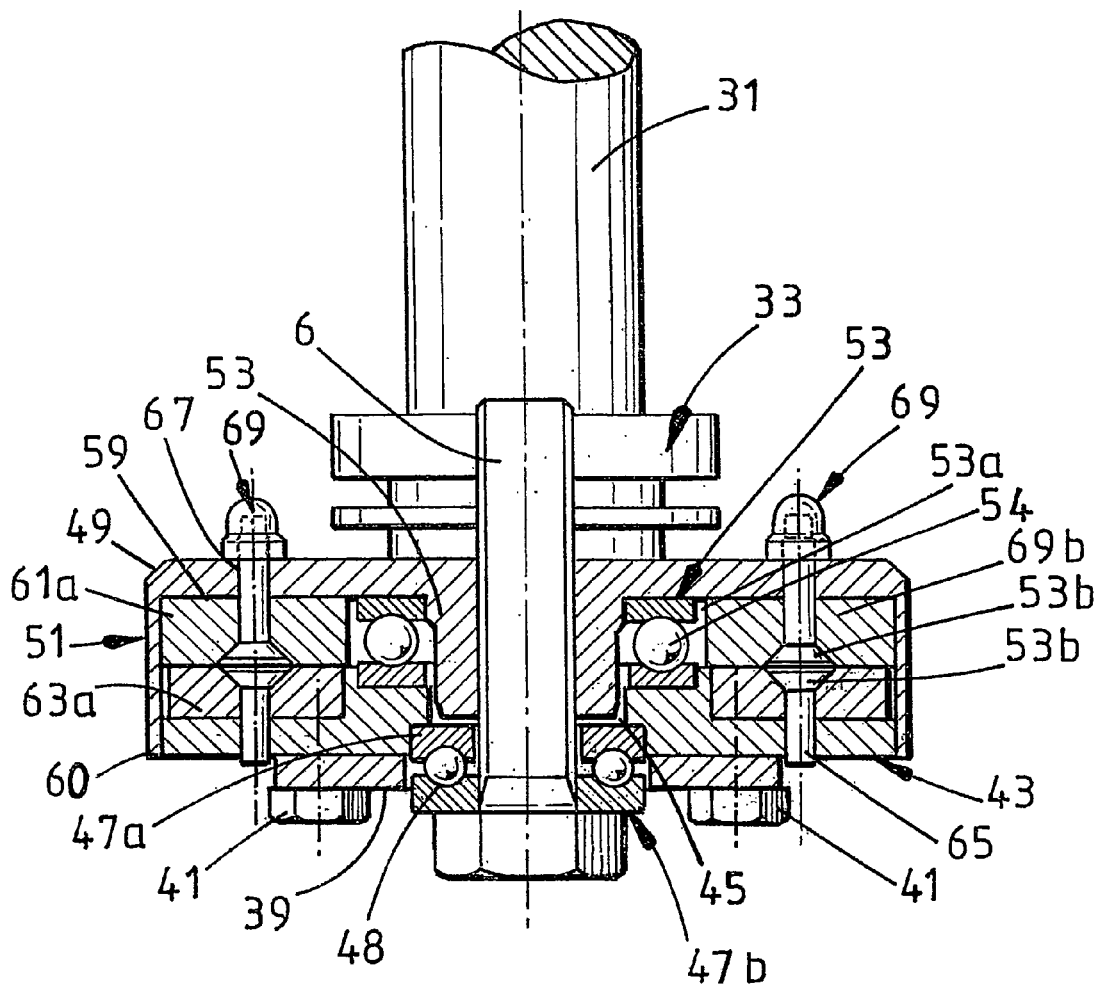

The present application is the national stage of the International Patent Application No. PCT/GB2003/003700, published in English and filed Aug. 26, 2003, which claims the benefit of GB Provisional Application No. 0219942.0 filed Aug. 28, 2002, and GB Provisional Application No. 0303274.5 filed Feb. 12, 2003, all of which are hereby incorporated by reference in their entirety.

The present invention relates to a support structure for a castor, to a castor provided with such a support structure, and to a castored trolley, especially a manually movable trolley, such as a supermarket trolley, a roll container, or a hospital trolley, but without limitation to same.

The majority of such trolleys, intended for the transport of goods or persons, are normally provided with four castors, each freely rotatable through 360°. In practice, this frequently leads to steering difficulties, either during required straight line movement, or when negotiating a corner or bend.

With a view to providing some steering control it is known to restrain the freedom of rotation of a castor by means of a spring loaded pin engaging in a recess, but such control proposals have been subject to minimal adoption.

An aim of the present invention is the provision of an improved support structure for a castor, and consequently an improved castor, and an improved castored trolley.

Accordingly a first aspect of the present invention provides a support structure for a castor comprising a first member, a second member that is rotatable with respect to the first member about a pivot axis, and magnetic means that is operable up to a certain torque to restrain movement of the rotatable member from one angular position with respect to the first member.

Conveniently, said one angular position corresponds to a desired registration of the first and second members. In other angular positions the magnetic means may be operable to permit free rotation unless and until re-registration occurs. Additionally or alternatively the magnetic means may be operable to bias the rotatable member into said one angular position when displaced therefrom.

The first and second members may comprise first and second plates. The first and second members may be located in co-axial spaced apart relationship so as to provide mutually facing surfaces. Bearing means may be located between the first and second members.

The magnetic means comprises at least one magnet. Preferably the magnetic means comprises at least one permanent magnet. More particularly the magnetic means comprises at least one pair of magnetically co-operable components, which may be the aforesaid first and second members, separate components or at least one separate component. More preferably they are two separate components. When separate components are provided one component of at least one pair of magnetically co-operable components is conveniently mounted with respect to each of said first and second members. More particularly a small air gap between the magnetically co-operable components creates a magnetic flux that provides said restraining effect.

A specific embodiment of the invention provides a support structure for a castor, comprising:

(i) first and second plates located in co-axial, spaced apart relationship so as to provide mutually facing surfaces, (ii) bearing means located between the plates whereby one plate is rotatable with respect to the other plate, and (iii) one component of at least one pair of co-operable components being mounted on each plate, at least one of which pair of components is a permanent magnet adapted, in one angular position of the rotary plate with respect to the non-rotary plate, to be brought into registration with a relatively small air gap between adjacent surfaces of the two co-operable components to create a magnetic flux that, up to a certain torque restrains rotation, and in other angular positions without registration permits free rotation unless and until re-registration occurs.

When the co-operable components are in register, i.e. aligned opposite one another, the magnetic flux restrains rotation of the rotatable member so that, when applied to a castor of, for example, a super market trolley, directional stability is achieved assisting steering of the trolley. Also, due to the use of magnetic flux to restrain rotation, there are no contact faces and no parts subject to wear. Clearly, the torque required to exceed the magnetic flux is a factor of the surface area of the magnet(s), and the air gap.

A second aspect of the invention provides a castor suitable for a manually movable trolley and comprising a support structure according to the first aspect of the invention.

The castor comprises a wheel, roller or other ground engaging rolling element that is mounted rotatably with respect to a support bracket. Conveniently the support bracket constitutes or forms part of the aforesaid second (rotatable) member. Preferably the support bracket is U shaped. Most usually bearing means is provided between the first and second members. Preferably at least one ball or roller bearing is used.

A third aspect of the invention provides a trolley provided with at least one, and preferably four, castors in accordance with the second aspect of the invention.

Most usually the non-rotatable member is attached to a leg of the trolley by a bolt, the head of which engages an outer surface of the rotatable member via a second ball or roller bearing. The trolley may be a super market trolley, a roll container, a patient trolley or any other wheeled conveyance provided with at least one castor for steering purposes. Preferably the trolley is manually movable.

Where provided the aforesaid first and second plates may be circular. Conveniently one of the first and second members, and preferably an upper one of the members, has an annular skirt or rim extending therefrom toward the other one of the members. More preferably still the skirt shrouds a part of the other member. The skirt preferably encloses the magnetic means.

Where a pair of co-operable components is utilized one component of the pair may be a permanent magnet and the other component of the pair may be a ferro-magnetic element. Alternatively, both components of the pair may be permanent magnets. The polarity of the magnets may be such as to rely on attraction or repulsion to achieve the desired registration of the relatively movable members. The permanent magnets may be disc magnets, bar magnets, ring magnets or any other shape of magnet. Any ferro-magnetic element that is used preferably has a shape that is the same as or complimentary to the shape of the permanent magnet or magnets that are used. The ferro-magnetic element is preferably steel. In one embodiment discs are used for the magnetically co-operable components. In another embodiment the magnetically co-operable components are arcuate, and extend over a limited area in the form of a predetermined quadrant, e.g. <90° of each plate, in which case the ferro-magnetic element, e.g. steel, is also arcuate, or the second permanent magnet is also arcuate.

There may be a plurality of pairs of magnetically co-operable components. Configurations other than pairs may be used. A ring magnet and a disc magnet may be used. The ring magnet may be polarized to have North at one edge and South at a diametrically opposite edge. The disc magnet may be polarized to have North confronting the ring magnet, Thus the disc magnet will be attracted to South on the ring magnet and the combination will operate to bias the disc magnet into the desired angular position. However it is preferred to use two pairs of magnetically co-operable components. Preferably they are located 180° apart. The pairs of magnetically co-operable components are disposed to have confronting faces that are slightly spaced apart to define an air gap therebetween. Preferably means is provided to adjust the spacing. Conveniently at least one component of the or each of the magnetically co-operable components is secured by screw means that facilitates adjustment of the axial spacing of the pairs of components. This provides for adjustment of the air gap.

In another embodiment at least one of the magnets may be an electromagnet and means may be provided to selectively energize and de-energize it.

Figure 7:
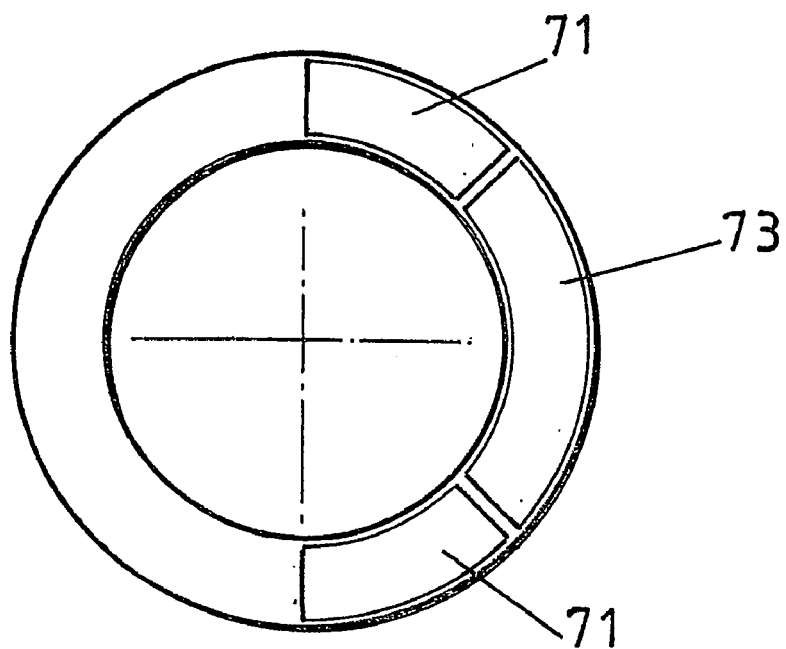
Figure 8:
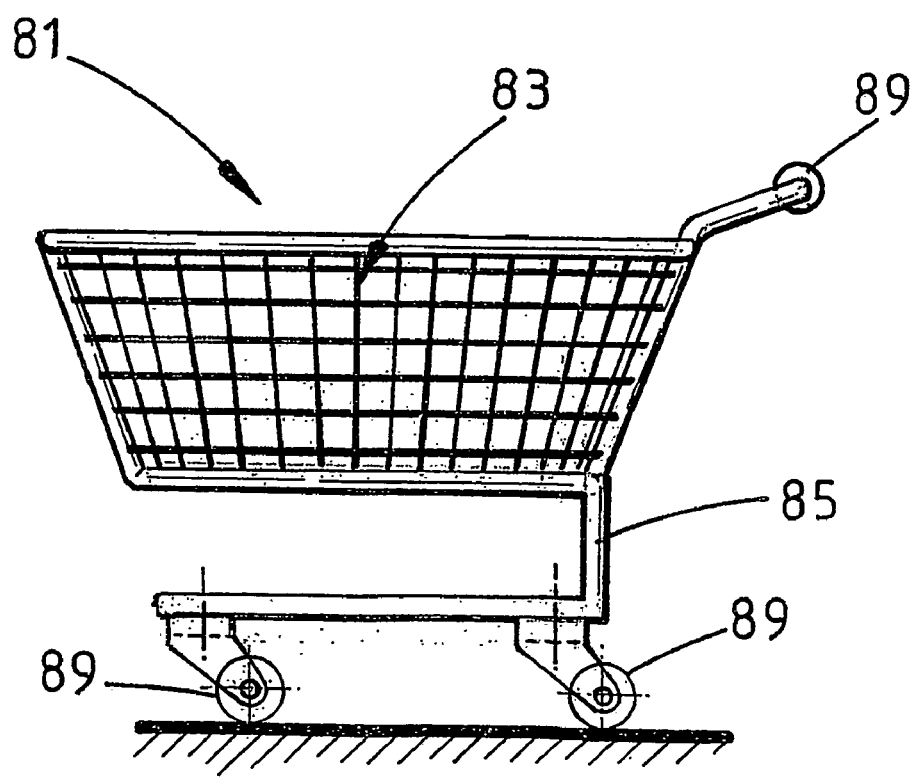

The various aspect of the present invention will now be described further hereinafter, by way of example only, with reference to the accompanying drawings; in which:

FIG. 1 is a broken away perspective view of a first embodiment of castor embodying the invention, FIG. 2 is a view corresponding to FIG. 1 but ghosted in part to show further constructional features, FIG. 3 is an end view of another embodiment of castor embodying the invention, FIG. 4 is an underneath plan view of the embodiment of FIG. 3, FIG. 5 is a section on X-X of FIG. 3, FIG. 6 is an enlarged sectional view of the part shown circled in FIG. 3, FIG. 7 is a schematic plan view showing the disposition of the magnets according to one embodiment, and FIG. 8 is a schematic side view of a trolley embodying the invention.

FIGS. 1 and 2 show a castor according to one embodiment that is adapted for securing to an item (not illustrated) that is required to be provided with a castor. The item may be a trolley as illustrated in FIG. 8. The castor comprises a wheel 1 mounted rotatably with respect to a support bracket 3 for rotation about axis Y. The support bracket itself is adapted to be mounted for rotation about pivot axis X. In the illustrated embodiment a swivel assembly is provided of which a cap 5 constitutes a first (non-rotatable) member thereof that in practice is secured fixedly with respect to the item to which the castor is secured, and the support bracket constitutes a second (rotatable) member thereof. The castor is secured in place by a headed fixing bolt 6 whose threaded shank is visible at 7 and whose head engages with the underside of securing washer 9. Support bracket 3 is formed with annular grooves 11, 13 to its opposite sides to receive respective sets of balls 15, 17 constituting bearing means of the castor assembly. One set of balls engage with the securing washer 9, whilst the other set engage with the under side of cap 5. Thus in the installed position the support bracket 3 is located rotatably between the cap and the securing washer.

Magnetic means is provided that is operable to influence movement of the rotatable part of the castor relative to the non-rotatable part, as described further hereinafter. More particularly at least one pair of magnetically co-operable components 21, 23 are provided, one of which 21 is mounted fixedly with respect to the first member, i.e. the cap 5, and the other 23 is mounted fixedly with respect to the second member, i.e. the support bracket 3. More particularly, the cap 5 has an annular recess 19 that accommodates the magnetically co-operable components 21, 23. The magnetically co-operable components can take a number of different configurations as described elsewhere in this specification. However, irrespective of the particular configuration, the magnetic means is operable, up to a certain torque, to restrain movement of the rotatable member from one angular position with respect to the non-rotatable member.

Thus the magnetic means relies on the principles of magnetic attraction and/or repulsion according to the configuration of the magnetically co-operable components.

In the embodiment of FIGS. 1 and 2, components 21 and 23 each comprise two pairs of permanent magnets 21a, 23a, 21b, 23b with each pair positioned 180° apart. The positioning of the magnets relative to one another is such that the respective North and South poles thereof will be adjacent when the movable part of the castor is in a desired angular position. The confronting faces of the two magnetically co-operable components are spaced slightly apart to ensure that there is always an air gap between the components and thereby maintain the effect of the magnetic flux therebetween. The components 21a, 21b and 23a, 23b have a discrete length that occupies part of an annulus. I.e. they are each annular segments. In FIG. 2 the components 21a, 23a have been marked with the letters N and S to show as an example the polarization of the two components at that point. Thus in the illustrated embodiment the components are magnetized to have the confronting surfaces of opposite polarity. Thus the components 21 and 23 will be attracted to one another whenever their magnetic fluxes are sufficiently close to interact. As soon as they escape the range thereof the rotatable component will be able to move freely. However as soon as the components move within range they will again be attracted to one another. Because each of components 21 and 21 is polarized in the same way, it will be seen that the rotatable member can be restrained in said one angular position when it is in two alternative positions 180° apart. Where this is not required, the components 21a, and 23a can be polarized in the opposite way to components 21b and 23b. Thus when component 23b approaches component 21a there will be repulsion.

As mentioned above, only one of the pairs of components 21 and 23 maybe a permanent magnet and the other may be a ferro-magnetic material.

If a turning moment is applied to the movable part of the castor relative to the non-movable part, the attraction between the North and South poles will resist the effect of the turning moment and by this means the wheel is restrained from moving away from said one angular position that corresponds to the registration of the first and second members and in the illustrated embodiment to the registration of the magnetically co-operable components. However steering movements are still possible because the magnetic flux has a finite value and once overcome will allow the rotatable member to move from said one angular position. Thus the rotatable member will be freely movable over the range of angular movement that is free of the influence of the magnetically co-operable components.

Referring now to FIG. 3 to 6. Parts corresponding to those referred to in the embodiment of FIGS. 1 and 2 are identified with the same reference numbers. An end of a trolley leg is shown at 31 and is provided with mounting block 33 that is threaded to receive a complimentarily threaded mounting bolt 6 to facilitate fixing of a castor assembly to the end thereof. The castor assembly comprises a wheel 1 rotatably mounted with respect to support bracket 3. The wheel is rotatable about axis Y and the mounting bracket is pivotable about axis X. Support bracket 3 has two limbs 35, 37 depending from a bridging portion 39. The bridging portion is secured by four bolts 41 to a lower mounting plate 43 which in the illustrated embodiment is generally circular with a co-axial through hole 45 of stepped diameter to secure and locate one half 47a of a lower thrust bearing 47. The head of bolt 6 engages with the other half 47b and ball bearings 48 are trapped between the two halves 47a, 47b. An upper mounting plate 49 has a downwardly extending rim 51 and a downwardly extending apertured central boss 53. A second thrust 53 bearing has its upper half 53a located on the underside of the upper mounting plate concentric with the boss 53. The lower half 53b of bearing 53 engages with a central boss 55 of the lower mounting plate thereby mounting the lower mounting plate rotatably with respect to the upper mounting plate. The upper and lower mounting plates have annular confronting surfaces 59, 60 axially spaced apart to receive magnetic means.

In the illustrated embodiment the magnetic means comprise two pairs of components 61a, 63a and 61b, 63b. The components comprise respective magnetic discs. The two pairs of components are spaced 180° apart. When the two pairs of components are in registration as shown in the drawing the wheel 1 is restrained in a desired angular position as represented by axis Z. Again, one component of each pair of components may be a ferro-magnetic material, such as steel.

The lower of the two components are secured to the lower mounting plate by respective countersunk screws 65. The upper of the two components are secured to the lower mounting plate by respective countersunk screws 67 cooperating with a respective nut 69. The confronting surfaces of the magnetically co-operable components are axially spaced apart to ensure that an air gap exists therebetween. The screws 65 and/or 67 facilitate adjusting the axial spacing of the components 61 and 63. Shims may be used in setting the desired spacing. The upper and lower plates will usually be of non-ferro-magnetic material, hence the use of magnets and/or ferro-magnetic material for said magnetically co-operable components.

By polarizing the disc magnets so that the confronting surfaces of components 61, 63 have opposite polarity, the pairs of components will be attracted to one another in the same manner as described above. Thus the rotatable plate will be restrained in the desired angular position, represented by axis Z, relative to the non-rotatable plate and in use will encourage straight line movement of the item to which such castors are fitted in the absence of a contrary steering movement.

From the above examples it will be apparent how magnetic attraction is used to promote a desired angular position of the rotatable part with respect to the non-rotatable part. FIG. 7 illustrates how repulsion can be used to achieve the same effect. Here three magnetically co-operable components are used. Two magnets 71 are positioned at spaced positions on a common pitch circle diameter and secured with respect to the non rotatable member, whilst a third magnet 73 is secured with respect to the rotatable member and positioned to be disposed intermediate the magnets 71. The polarity of the three magnets are configured so that the magnetic flux acts to repel magnet 73 from each of magnets 71 into the position shown and thereby urge the rotatable member into a desired angular position with respect to the non rotatable member.

Referring now to FIG. 8 there is illustrated a trolley 81 in the form of a typical super market trolley having a wire basket 83 carried on a framework 85 and provided with a handle 87 for use in maneuvering the trolley. The trolley is provided with four castor assemblies 89 (only two of which are visible in the side elevation of FIG. 8) embodying the invention hereof. The castor assemblies are not described in detail as they may correspond to any of the embodiments described herein that are operable as described to constrain the wheels thereof to adopt preferentially said one angular position. In practice said one angular position will be such as to predispose the trolley to move in a straight-ahead direction. This may dictate that each of the castors is secured to the framework in such a way that said one angular position lies in the same plane or at least planes that are parallel. On the other hand the planes may be slightly inclined with respect to one another so as to give rise to a self centering steering effect as is commonly used in motor vehicles. I.e. with the respective wheels adopting a so-called toe in configuration.

The construction of the magnetically co-operable components described in the above embodiments may be replaced by any of the alternative configurations mentioned above as will be apparent to one skilled in the art.

The invention claimed is:

1. A support structure for a castor comprising a first member, a second member that is rotatable with respect to the first member about a pivot axis, and magnetic means that is operable up to a certain torque to restrain movement of the second member from one angular position with respect to the first member, wherein said magnetic means comprises a first magnet associated with the first member and a second magnet associated with the second member, said first magnet being coaxially aligned with respect to said second magnet wherein said first magnet and said second magnet are disposed to have confronting faces that are spaced apart to define an air gap therebetween, and means is provided to adjust the spacing between confronting faces of said first magnet and said second magnet.

2. A support structure for a castor as claimed in claim 1 in which said one angular position corresponds to a desired registration of the first and second members.

3. A support structure for a castor as claimed in claim 1, in which the magnetic means is operable to bias the second member into said one angular position when displaced therefrom.

4. A support structure for a castor as claimed in claim 1, in which the first and second members have co-axial spaced apart mutually facing surfaces.

5. A support structure for a castor as claimed in claim 1, in which the magnetic means comprises a plurality of magnetically co-operable components at least one of which is associated with the first member and at least one of which is associated with the second member.

6. A support structure for a castor as claimed in claim 1, in which the magnetic means comprises at least one permanent magnet.

7. A support structure for a castor as claimed in claim 1, in which the magnetic means comprises at least one ferro-magnet.

8. A support structure for a castor as claimed in claim 1 in which said air gap between said first magnet and said second magnet creates a magnetic flux that provides said restraining effect.

9. A support structure for a castor as claimed in claim 1, in which one of the first and second members has an annular skirt or rim extending therefrom toward the other one of the members.

10. A support structure for a castor as claimed in claim 9 in which the skirt encloses the magnetic means.

11. A support structure for a castor as claimed in claim 1 in which said first magnet is a permanent magnet and said second magnet is a ferro-magnetic element.

12. A support structure for a castor as claimed in claim 1 in which both said first magnet and said second magnet are permanent magnets.

13. A support structure for a castor as claimed in claim 1, in which a disc is used for said first magnet or said second magnet.

14. A support structure for a castor as claimed in claim 1, in which either the first magnet or the second magnet is arcuate.

15. A support structure for a castor as claimed in claim 1, in which a plurality of pairs of magnetically co-operable components are used and disposed at spaced positions on a common pitch circle diameter.

16. A support structure for a castor as claimed in claim 15 in which two pairs of magnetically co-operable components are used that are located 180° apart.

17. A castor suitable for a manually movable trolley and comprising a support structure according to claim 1.

18. A castor as claimed in claim 17 and comprising a wheel, roller or other ground engaging rolling element that is mounted rotatably with respect to a support bracket.

19. A castor as claimed in claim 17 in which the support bracket constitutes or forms part of the aforesaid second member.

20. A trolley provided with at least one castor as claimed in claim 17.

21. A trolley as claimed in claim 20 when provided with four castors.

22. A trolley as claimed in claim 20 when manually movable.

23. A support structure for a castor, comprising:

(i) first and second plates located in co-axial, spaced apart relationship so as to provide mutually facing surfaces, (ii) bearing means located between the plates whereby one plate is rotatable with respect to the other plate, and (iii) one component of at least one pair of co-operable components being mounted on each plate, at least one of which pair of components is a permanent magnet adapted, in one angular position of the rotary plate with respect to the non-rotary plate, to be brought into registration with a relatively small air gap between confronting adjacent surfaces of the two co-operable components to create a magnetic flux that, up to a certain torque restrains rotation, and in other angular positions without registration permits free rotation unless and until re-registration occurs wherein said components of said at least one pair of co-operable components mounted on each plate are co-axially aligned with respect to one another and means is provided to adjust the spacing between confronting surfaces of said two co-operable components.

* * * * *

UNITED STATES PATENT AND TRADEMARK OFFICE
CERTIFICATE OF CORRECTION

| | |
|---|---|
| PATENT NO. | : 7,383,611 B2 |
| APPLICATION NO. | : 10/526770 |
| DATED | : June 10, 2008 |
| INVENTOR(S) | : Alan Foster |

It is certified that error appears in the above-identified patent and that said Letters Patent is hereby corrected as shown below:

On the Title page of the patent, item [75], Inventor, please change "Glosson" to --Glossop--

Signed and Sealed this

Fifth Day of August, 2008

JON W. DUDAS
*Director of the United States Patent and Trademark Office*